E. B. LAKE.
Curtain-Fixture.

No. 159,424.

Patented Feb. 2, 1875.

Witnesses
J. B. Connolly
J. A. Connolly

Inventor
Ezra B. Lake
By Connely Bros
Attorney

UNITED STATES PATENT OFFICE.

EZRA B. LAKE, OF TOM'S RIVER, NEW JERSEY.

IMPROVEMENT IN CURTAIN-FIXTURES.

Specification forming part of Letters Patent No. 159,424, dated February 2, 1875; application filed June 15, 1874.

*To all whom it may concern:*

Be it known that I, EZRA B. LAKE, of Tom's River, in the county of Ocean and State of New Jersey, have invented a certain new and useful Improvements in Curtain-Fixtures; and I do hereby declare the following to be a full, clear, and exact description of the invention, such as will enable others skilled in the art to which it pertains to make and use it, reference being had to the accompanying drawings, which form part of this specification, in which—

Figure 1:
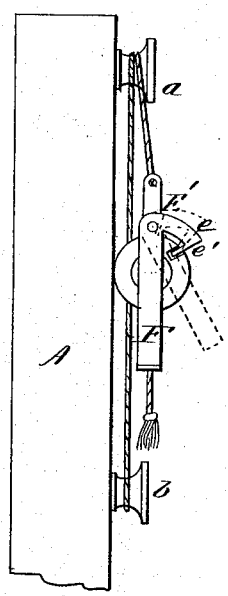
Figure 2:
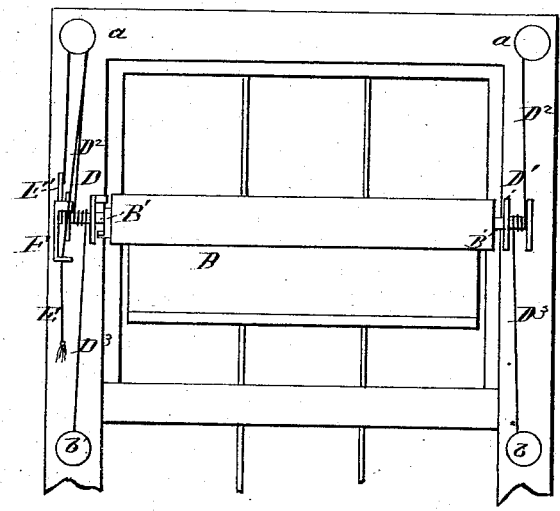
Figure 3:
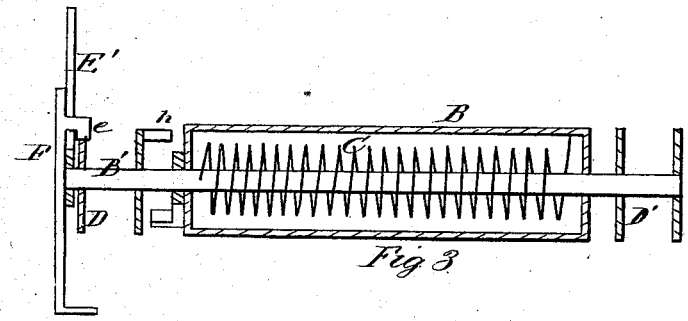

Figure 1 is a side view. Fig. 2 is a front view. Fig. 3 is a vertical central section.

This invention has relation to curtain-fixtures, and consists in the novel construction and combination, with an adjustable curtain-roller and drawing-cord, of a dog or catch, adapted to engage with a notched disk on the end of the roller-shaft, and so arranged with relation to the cord as to be controlled thereby for engagement or disengagement, in the manner hereinafter specifically described and claimed.

Referring to the accompanying drawings, A designates a window-frame having attached to its inner surface the knobs or cord-holders $a\ a\ b\ b$, the former located near the top, and the latter, say, half-way between the top and bottom of the window-frame. B designates a hollow curtain-roller, arranged to revolve loosely upon a shaft, B′, and containing a spring, C, one end of which is attached to the shaft and the other to the roller, so that by turning either separately the spring may be contracted for automatic action. D D¹ designate pulleys, attached to the ends of the shaft B′, and D² D³ are cords, one end of each of which is secured to a pulley, while the other ends are attached respectively to the knobs or cord-holders $a\ a\ b\ b$. The cords D² D³ are wound around the cores of their pulleys in opposite directions, respectively, so as to allow the latter, with shaft and roller, to travel up and down on cord, one being wound upon the pulley while the other is unwound, thus causing the pulleys to rotate when impelled lengthwise of said cords. E designates the cord whereby the pulleys and roller are elevated. This cord is attached by one end to an arm, E′, loosely arranged upon one end of the shaft B′, and thence passes upward and over one of the knobs $a$, and thence downward and through an eye in the lower end of a lever-pawl or dog, F, which is pivoted to the loose arm E′, and has a projecting arm, $e$, provided with a laterally-extending tooth, $e′$, designed to engage or enter a notch in the outer flange or head of the pulley D, or other equivalent disk, for the purpose of retaining the roller at any desired height. The roller is raised by drawing the cord E downward, and, in order to disengage the lever-pawl, the cord is to be drawn outward from the face of the window-frame, as shown in dotted lines, Fig. 1, of the drawings.

Having fully described my invention, I claim—

The combination, with the adjustable roller B and notched plate D, of the pivoted dog F and drawing-cord E, said cord and dog being connected together and relatively arranged substantially as described, to serve the double purpose of controlling the dog and raising the curtain, as set forth.

In testimony that I claim the foregoing I have hereunto set my hand this 14th day of May, 1874.

EZRA B. LAKE.

Witnesses:
 EUGÈNE P. EADSON,
 JNO. A. BELL.